Nov. 3, 1959     E. V. CRANE ET AL     2,911,080
OVERLOAD CLUTCH
Filed Oct. 10, 1955     3 Sheets-Sheet 1
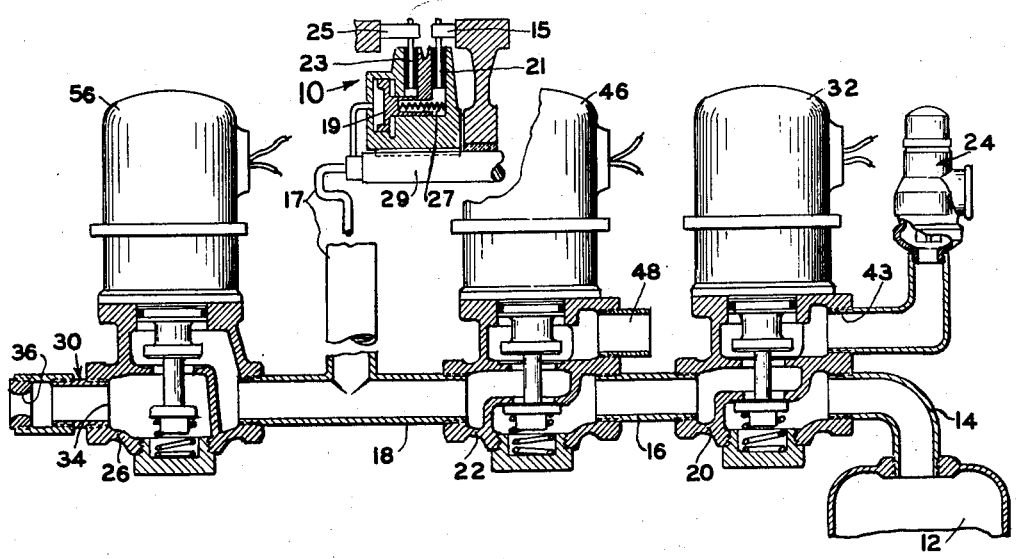
FIG. 1
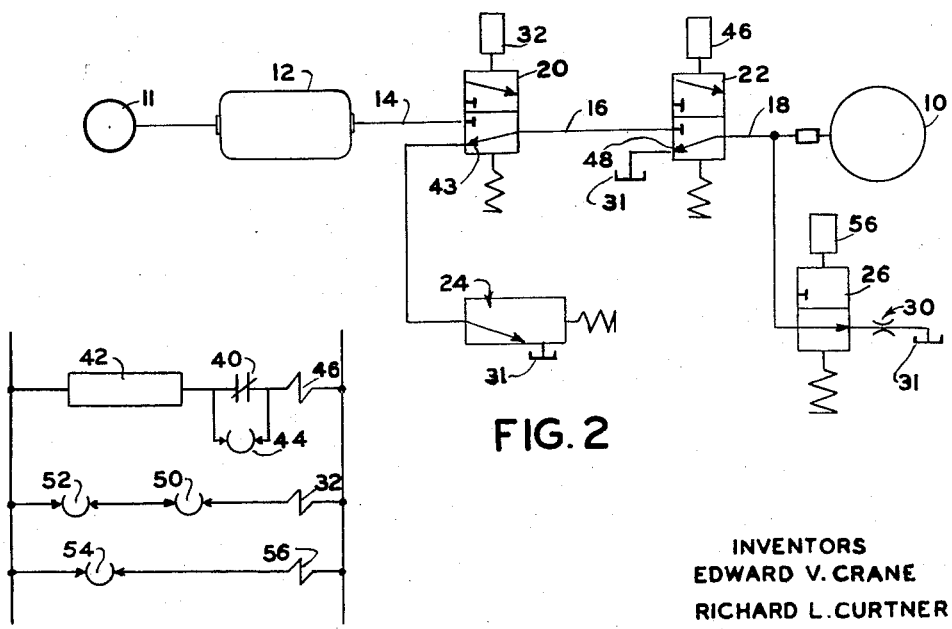
FIG. 2
FIG. 3
INVENTORS
EDWARD V. CRANE
RICHARD L. CURTNER
BY    FRANK P. FEHN SR.
*Williams & Tilberry*
ATTORNEYS Nov. 3, 1959 E. V. CRANE ET AL 2,911,080
OVERLOAD CLUTCH
Filed Oct. 10, 1955 3 Sheets-Sheet 2

INVENTORS
EDWARD V. CRANE
RICHARD L. CURTNER
BY FRANK P. FEHN SR.

ATTORNEYS

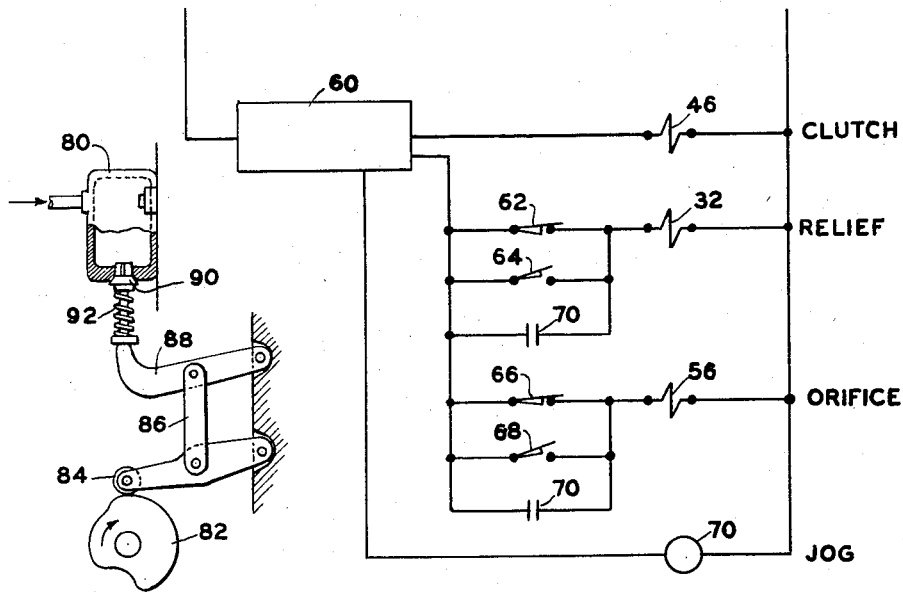

United States Patent Office 2,911,080
Patented Nov. 3, 1959

2,911,080

OVERLOAD CLUTCH

Edward V. Crane, Richard L. Curtner, and Frank P. Fehn, Sr., Canton, Ohio, assignors to E. W. Bliss Company, Canton, Ohio, a corporation of Delaware Application October 10, 1955, Serial No. 539,366

11 Claims. (Cl. 192—150)

This invention relates to torque control mechanisms associated with machinery such as crank driven power presses and the like to limit maximum values of tonnage in the press stroke, and refers, in particular, to fluid pressure torque control mechanisms associated with clutches of the friction disc variety.

Problems associated with overload control and torque control devices are also set forth and discussed in the United States Patent No. 2,644,563, issued to L. J. Crary, entitled Overload Coupling, and assigned to the assignee of the present invention. However, whereas the patent to Crary relates to the utilization of electromagnetic means in protecting mechanisms such as power presses against unexpected overloads which might prove to be injurious to the various parts of the machine, the present invention relates to mechanisms adapted to achieve comparable protection by either pneumatic or hydraulic means.

For illustrative purposes, the following discussion will be directed to the application of a preferred embodiment of a torque control mechanism as it applies to a mechanical crank driven press, it being understood that this invention is not intended to be limited to this specific application, but is also suitable for use on other types of machines. However, torque control and related tonnage control presents problems which are of particular interest with respect to the mechanical press art, thereby making the selection of a mechanical press for purposes of discussion uniquely useful and appropriate in explaining the operation of the invention.

Hereinafter the invention will be referred to as a fluid actuated overload and torque control device, the word fluid being defined to mean either gas or liquid. In actual practice, the gas employed is air and the liquid a substance such as common hydraulic brake fluid.

The length of time a press is under loaded condition is relatively short, and even though the tonnage rating of a press may be a small value, the rate at which a tonnage load comes on a press will be in the neighborhood of several thousand tons per second, more or less, depending on the operating speed of the press. It is necessary, therefore, in order to protect a press from serious overload conditions, to transmit an approximately constant value of torque to the crankshaft that will produce rated value of press tonnage for positions relatively high in the stroke and thereafter a progressively diminishing value of torque until the crank reaches bottom position. This method of tonnage control involves working the clutch at the ultimate torsional capacity for the various values of pressure in the cycle.

There are various detecting devices now on the market which measure overload and then initiate a chain of events to stop a press. These devices, however, are usually one stroke too slow in that they do not stop the press during the stroke in which the overload occurs. Applicants have found that the time available to detect an overload condition in a press and to stop it safely is in the range of milliseconds. The invention has been developed, therefore, to have an overload preventative action which will operate in the extremely short time available and to stop the press before damage can be sustained by the serious overload. The invention has also been developed and has been found to be very effective for use in combination with a conventional friction disc type crankshaft clutch, thereby rendering it widely and readily applicable to a high percentage of present press installations.

Another advantage of the invention resides in the fact that due to its light construction, it can be secured directly to a crankshaft mounted friction clutch to which the flywheel energy is transmitted through this clutch to the crankshaft. The invention in combination with a crankshaft mounted clutch to regulate torque has the advantage over clutches of the backshaft variety in that the momentum (flywheel effect) of the main gear and pinion has been eliminated.

A further advantage of the present invention resides in its ready adaptability for use in any shop equipped with air pressure lines. Since air pressure is standard equipment in most factories, the cost of installation and maintenance of the invention is quite low. In other installations, a completely closed hydraulic system can be employed to advantage. In either case, however, the theory of operation is the same.

It is, therefore, the principal object of this invention to provide a method of torque control for crank driven mechanisms, such as presses and the like, wherein fluid pressure to the clutch is regulated according to a predetermined pattern. By so doing, a certain value of pressure will produce a predetermined value of torque within limits of friction variations which, according to crank angle position, will at all times deliver rated tonnage at any point in the stroke of the mechanism.

In accordance with the teaching of the invention, the values of fluid pressure on the clutch during the first few degrees of crank motion from top dead center position may sometimes be high in order to accelerate the moving parts with a minimum of clutch slippage. Under certain other conditions, however, for some slow speed geared presses, the pressure sufficient to provide full normal constant torque will also be sufficient to accelerate the crankshaft assembly. In the first instance, surplus pressure is thereafter exhausted or otherwise diverted from the clutch so that the torque delivered by the clutch will not exceed the rated constant torque value of the press. When the crankshaft is relatively low in its stroke, say at the 150° position of rotation, a progessive reduction in fluid pressure occurs to compensate for the increasing mechanical advantage of the crankshaft, and this pressure reduction continues until the crankshaft passes through bottom dead center and begins its return stroke. Full pressure is then reapplied during the balance of the return stroke to return the crankshaft rapidly to top dead center in preparation for another work cycle.

In the second instance, i.e., the operation of slow speed geared presses, the pressure which provides full normal constant torque is maintained until the crankshaft is approximately at the 150° position of rotation, as aforesaid, whereinafter the said progressive reduction of fluid pressure occurs to compensate for the increasing mechanical advantage of the crankshaft. As in the first instance, the pressure reduction continues until the crankshaft passes through bottom dead center and begins its return stroke, full pressure thereafter being reapplied during the balance of the stroke.

In this manner, the crankshaft is provided with torque to produce, say, one-half tonnage at mid-stroke, full tonnage near bottom stroke, and thereafter full tonnage continually through bottom center of the workstroke. At the point in the travel of the crankshaft where a constant value of torque first produces rated tonnage, the torque capacity is thereafter controlled so that the ratio of torque to effective lever arm of the crankshaft is a constant value which will result in a development of rated tonnage.

The method of controlling the fluid pressure to the clutch is shown in the mechanical and electrical diagrams wherein:

Figure 1 illustrates a preferred arrangement of solenoid operated valves in the de-energized position employed in conjunction with a friction disc clutch and adapted to supply fluid pressure to the clutch according to a predetermined pattern;

Figure 2 is a diagrammatic showing of solenoid operated valves in the de-energized position similar to Figure 1 and illustrating the fluid pressure circuitry between a pressure reservoir, the clutch and related control means, this circuit being applicable to either gas or liquid pressure systems;

Figure 3 is a schematic showing of the wiring diagram adapted to energize the valve solenoids of either Figures 1 or 2 according to a predetermined pattern;

Figure 7 is a schematic showing of another preferred embodiment of a wiring diagram adapted to energize the valve solenoids of either Figures 1 or 2 according to a predetermined pattern;

Figure 8 is a chart of valve sequence tabulation for the valves illustrated in Figures 1 and 2 and controlled by the circuit shown in Figures 3 and 7; and Figure 9 is a schematic partially sectioned view of alternative valve means which may be employed with preferred embodiments of the invention.

Figure 4:
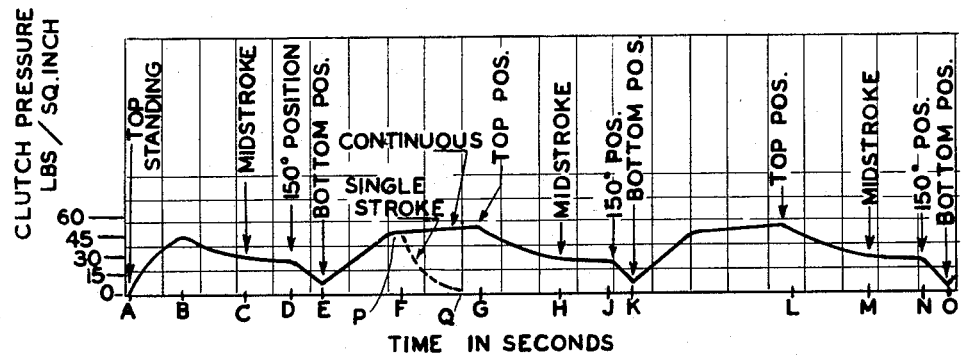
Figure 4 is a chart showing the clutch fluid pressure during two cycles of operation of a press crankshaft, illustrating the difference in pressure during single tripping and continuous tripping operations.

Reference is now made to the figures in greater detail and, in particular, to Figures 1 and 2 wherein is shown one embodiment of the invention preferred when high initial torque is required to quickly accelerate moving parts with a minimum of clutch slippage. This embodiment comprises a clutch 10 connected to a pressure regulated fluid tank 12 by means of lines 14, 16 and 18, and valves 20 and 22 connected in series between lines 14 and 16, and 16 and 18, respectively.

Valve 20 is a spring off-set three-way normally closed valve which is controlled by switch means, to be described hereinafter, to separate the tank 12 from the clutch 10 when the crankshaft of a press reaches a predetermined angular position during a cycle of operation. De-energizing the solenoid 32 on valve 20 blocks the path of flow from the tank 12 and connects the fluid pressure in the clutch to a relief valve 24 by way of exhaust port 43, which lowers the pressure in the clutch to a value which will not permit the clutch to slip under rated torsional load of shaft and gearing while the crank angle rotates from top dead center or 0° to approximately the 150° position.

The spring-loaded relief valve 24 is connected to the exhaust port of valve 20 and is pre-set to permit fluid to escape until a certain predetermined minimum pressure is reached, whereinafter it automatically closes by mechanical means such as a spring, or the like. In the case of air, the escape is to the atmosphere; in the case of fluid, the escape is into a tank 31, from where it is recirculated to pressure regulator 11 by pipe means (not shown).

Valve 22 is also a spring off-set normally closed three-way valve which is controlled from the standard press control panel 42, consisting of the usual start-stop and jog-run push-button stations conventionally found on power presses (see Figures 3 and 4). Operation of the solenoid 46 on valve 22 from the standard push-button control station merely starts or stops the press in the cycle. The valve arrangement for torque control is independent from the press operating controls; however, the two controls function together as a unit.

Another solenoid operated valve 26 is also connected to the clutch and is adapted to control the rapid exhausting of fluid from the clutch through an escapement means 30. Valve 26 is a spring off-set normally open two-way valve, i.e., normally open when its solenoid 56 is de-energized, which is controlled by switch means to initiate a progressive reduction of fluid pressure starting at approximately the 150° position of crankshaft rotation. The orifice or escapement mechanism 30 associated with valve 26 comprises a valve exhaust port 34 (see also Figure 1) connected to an orifice 36. As aforesaid, air escapes into the atmosphere, but liquid escapes into tank 31.

The clutch 10 preferably is of the combination clutch-brake type unit. The clutch portion 15 is actuated by fluid pressure from pressure line 17 acting on piston 19 simultaneously to engage the clutch friction discs 21 and disengage the brake friction discs 23 of brake 25. When the pressure is cut off from line 17, brake spring 27 automatically disengages clutch 15 and re-engages or sets brake 25 to stop the rotation of the member 29 upon which the clutch 10 is mounted. The tank 12 is provided with a supply of fluid which is maintained under pressure by pump means 11, or the like. Electrical drum switch controls can be arranged to use either normally open or normally closed valves in the system.

After the crankshaft has passed through bottom dead center, the danger of overload to the press parts has passed, and efficient operation requires that the crankshaft be returned to top dead center as quickly as possible prior to commencing another work cycle. To this end, valve 26 is closed and valve 20 is opened to admit maximum fluid pressure to the clutch during the last one-half of the operating cycle.

As will be set forth more fully hereinafter, valve 22 may be operated to exhaust fluid from clutch 10 through exhaust port 48 to atmosphere, or into tank 31, and to this end, tanks 31 are open to the atmosphere so as not to develop any back pressure in the system which might retard operation of any of the valves.

Referring now to Figure 3, the electrical diagram therein shown is adapted to energize the above described solenoid valves in accordance with the above set forth predetermined sequence of operation. The electrical network schematically shown relating to a drum switch type mechanism is illustrative only since the same controls may be achieved electronically or by other electrical switching means well understood in the art. Although the present electrical diagram, shown in Figure 3, is illustrative of merely one means for achieving the desired controls, it has been found that the drum switch arrangement functions very well, is inexpensive to adapt and is easy to maintain and regulate.

The torque control switching system includes a time relay 40 which is initiated from a drum switch contact and remains closed for a period of time independent of crank angle position, but normally until the crankshaft has been rotated approximately 190°. Time relay 40 is in parallel with a drum switch 44 synchronized to rotate with the crankshaft of the press, and is adapted to close a few degrees before the time relay would normally open, e.g., at the 185° position. It follows, therefore, that if the press encounters an unexpected overload at any point between top dead center and bottom dead center, the drum switch 44 will not rotate to its circuit closing position at 185° of rotation, and shortly after the time it should normally be at this position the time relay 40 will open by virtue of mere passage of a predetermined period of time, thereby de-energizing the solenoid 46 of valve 22 which then closes and cuts off the supply of fluid to the clutch 10 and applies the spring set brake by exhausting fluid in the clutch. Since the drum switch 44 makes contact at approximately 185° to close the line between the control panel 42 and solenoid 46, if the press is not stopped by an overload, valve 22 remains energized during the cycle by the overlap of the time relay 40 and the drum switch 44 which are, as aforesaid, in parallel.

After the crank angle of the crankshaft passes through the 150° position, the mechanical advantage of the crankshaft increases quite rapidly, but, at the same time, the fluid pressure in the clutch 10 is being reduced through the adjustable choke orifice 36 at a rate adapted to compensate for the increasing mechanical advantage of the crankshaft. Accordingly, in the event the press is overloaded between 150° and 180° (the most critical area of press operation), the clutch 10 will slide during the instant the overload is building up, and fluid will continue to be exhausted through the orifice 36 to apply the brake and of course remove the driving torque.

Solenoid 32 of valve 20 is opened by a drum switch 50 and thereafter closed by drum switch 52, both switches rotating in synchronization with the crankshaft of a press. Valve 22 is normally closed by mechanical means to cut off fluid supply into the clutch 10, but is opened by its solenoid 46 when the press operator pushes the start button on the control panel 42. Valve 20 is also normally mechanically held closed, but is solenoid energized by drum switch 52 to cooperate with valve 22 in admitting fluid from tank 12 into clutch 10. After full fluid pressure has been admitted into the clutch for a period sufficient to overcome the inertia of the press parts and to set them in motion, drum switch 50 de-energizes the solenoid 32 of valve 20 wherein valve 20 mechanically shuts off the supply of fluid from the tank 12 and connects the fluid from the clutch 10 to fluid relief valve 24.

At the 150° position of the crankshaft, drum switch 54 is rotated to complete a circuit and energize the solenoid 56 to open valve 26 whereupon the fluid from clutch 10 passes through valve 26 and is permitted to escape through the fluid choke orifice 30. Thus, in this manner, the rapidly increasing mechanical advantage of the crankshaft during the critical period of operation between 150° and 180° is compensated by rapid but controlled reduction in fluid pressure in the clutch 10 whereby the clutch torque capacity is reduced to maintain rated tonnage. After the crankshaft has passed through the bottom of its stroke, valve 26 is closed by drum switch 54 and valve 20 is reopened by drum switch 50 to admit maximum fluid pressure to the clutch 10, thereby facilitating a quick return of the crankshaft to starting position at the top of its stroke.

Figure 5:
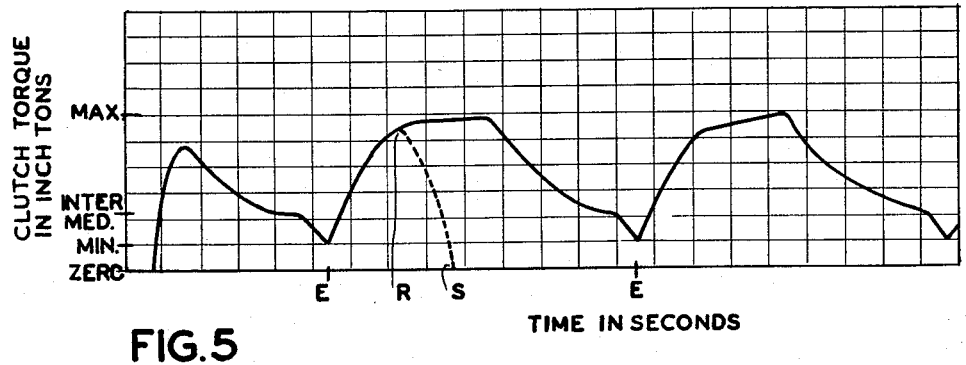
Figure 5 is a chart showing the clutch torque capacity as a function of the pressure shown in the curve of the chart of Figure 4.
Figure 6:
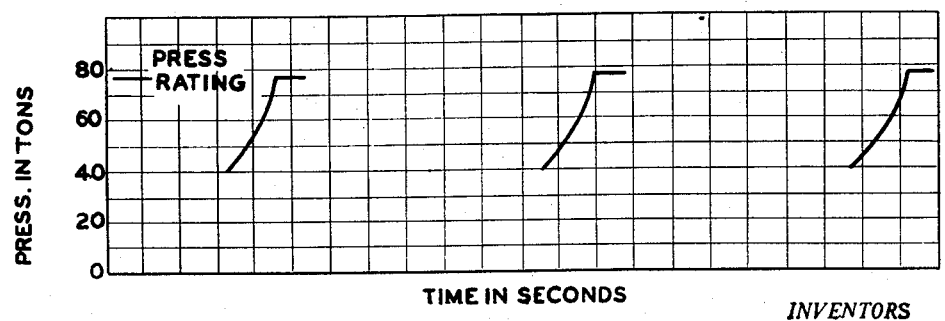
Figure 6 is a chart showing the maximum press tonnage developed during one operating cycle as a function of the clutch torque shown in Figure 5, wherein the maximum press tonnage curve of this figure is obtained by dividing the corresponding torque of Figure 5 by the effective lever arm of the crankshaft during the working portion of the press stroke.

Control of fluid pressure throughout the cycle of operation, as shown in Figure 4, produces the desired torque pattern of Figure 5, which is a function of the fluid pressure pattern of Figure 4. It is the torque capacity pattern of Figure 5 which is critical in limiting the press tonnage pattern of Figure 6 so that it does not exceed the maximum press rated tonnage and, in particular, the maximum press rated tonnage between 150° and 180° of crankshaft rotation. It will be noted from an inspection of Figure 5 that due to the friction between the main crankshaft bearings and slide bearings, which amounts to an appreciable value, the infinite lever arm of the crank as it approaches bottom dead center requires some small amount of torque, indicated at E, in order to carry the crankshaft around to the return stroke side of the cycle.

It will be noted in Figures 4 and 5 that the broken line portions of the curves PQ and RS respectively represent fluid pressure and torque decay between each work cycle of single stroke operation, i.e., when the press is brought to a complete stop between each stroke. For continuous operation, the solid portions of the curves extending beyond points P and R respectively represent fluid pressure and torque characteristics of the clutch. After one cycle of operation, the curve patterns repeat in sequence.

Referring now to the alternate schematic wiring diagram of Figure 7, it will be seen that the standard press control 60 operates the solenoid 46 of the valve 22 to start, stop, jog and run single stroke or continuous operation. Limit switch 62 is adapted to de-energize solenoid 32 at points B, G and L of Figure 4 to shut off the supply of fluid pressure to the clutch 10 and to connect relief valve 24 thereto. Limit switch 64 is adapted to energize solenoid 32 of valve 20 at bottom center points E, K and O to restore full fluid pressure to the clutch. Limit switch 66 is adapted to drop out solenoid 56 of valve 26 at points D, J and N, thereby exhausting clutch fluid pressure through orifice 30. Limit switch 68 is adapted to pick up solenoid valve 56 at bottom center points E, K and O to close orifice 30. The control relay 70 is adapted to be energized and closed by the jog selector of the standard press control to shunt limit switches 62, 64, 66 and 68, whereby full fluid pressure is applied to the clutch 10 for all positions of the crankshaft in the cycle.

The chart shown in Figure 8 sets forth graphically the valve sequence of operations during a work stroke for both single and continuous operation of a press.

In that stage of operation which occurs when constant torque and increasing mechanical advantage would begin to overload frame members, in the apparatus set forth hereinabove, valve 26 opens the clutch 10 to the escapement mechanism 30 to permit a drop in pressure at a desired rate. This orifice type escapement mechanism is advantageous in that in the case of a complete stall the pressure will continue to drop and the clutch will not be subjected to heating by continuous slipping of the clutch plates.

There is yet another means for reducing pressure during the working portion of the press stroke which is satisfactory and may be used in the alternative for the valve 26, solenoid 56 and escapement mechanism 30. This device comprises a cam actuated relief valve 80 (see Figure 9), a cam 82 synchronized to rotate with the crankshaft of the press, a cam follower 84, and connecting links 86 and 88 adapted to transfer the movement of the cam follower 84 to a spring loaded valve plunger 90. In this alternative embodiment the rotation of the cam changes the compression of the spring 92 of the plunger 90 according to the predetermined profile or face of the cam 82, resulting in a corresponding drop in the pressure being maintained by the relief valve 80.

In the operation of slow speed geared presses, discussed briefly hereinabove, inasmuch as it is possible that the pressure which provides full normal constant torque is also sufficient to accelerate the crankshaft assembly, it is therefore possible to provide a simplified embodiment of the invention. Valves 22 and 26 remain unaltered in operation, but valves 20 and 24, as such, would not be required since the tank pressure would be set to that value which is the limit of safe load for gearing and torsional strength of the crankshaft.

It is to be understood that while preferred embodiments of the invention are shown herein, these embodiments are by way of example only and are to be limited only by the scope of the subjoined claims.

Other arrangements and modifications will occur to those skilled in the art and may be resorted to without departing from the scope of the invention.

We claim:

1. A fluid torque control mechanism comprising a clutch; a single source of fluid pressure connectable to said clutch; a fluid pressure escapement connectable to said clutch; and means to selectively connect said clutch to said single source of fluid pressure or to said fluid pressure escapement, whereby said clutch is energized by said fluid pressure to transmit a predetermined value of torque for a first predetermined period of the work portion of a cycle of operation, and whereinafter said clutch is progressively deenergized by said fluid pressure escapement to transmit a progressively diminishing torque for a second predetermined period of the work portion of a cycle of operation, a second fluid pressure escapement to de-energize said clutch; cyclically operable switch means adapted at a predetermined point in a cycle of operation to render said second fluid pressure escapement operable; and a time relay adapted to maintain said second fluid pressure escapement inoperable independent of the cyclic operation of said switch means for a predetermined period normally extending beyond said predetermined point in a cycle of operation, whereby said time relay thereafter actuates said second fluid pressure escapement to de-energize said clutch when said switch means does not normally rotate to said predetermined point in a cycle of operation due to a cycle stalling overload.

2. In a crankshaft driving mechanism the combination of a fluid pressure operable clutch and clutch torque control means including: a source of fluid pressure connectable to said clutch; first and second solenoid operated valves connected in series between said source of pressure and said clutch; a third solenoid operated valve connected to said clutch; a pressure relief valve connected to said second solenoid operated valve; a fluid escapement orifice connected to said third solenoid operated valve; switch means to energize the solenoid of the said first valve to connect said clutch to said second valve; and switch means adapted sequentially to energize the solenoid of said second valve to connect said source of pressure through said first valve to said clutch, de-energize the solenoid of said second valve to connect said clutch to said pressure relief valve, energize the solenoid of said third valve to connect said clutch to fluid escapement orifice, and re-energize the solenoids of the said second and third valves to close the said pressure relief valve and escapement orifice, respectively, and to reintroduce pressure into said clutch, said switch means operating cyclically in synchronization with the rotation of the said crankshaft, whereby the said clutch is regulated to impart maximum torque at the start of a work cycle and thereafter to impart diminishing torque according to a predetermined pattern until the said crankshaft passes through bottom dead center, and thereafter maximum torque quickly to return the crankshaft to top dead center starting position.

3. The combination clutch and clutch torque control means set forth in claim 2, wherein said pressure relief valve is spring loaded to cut off escape of fluid from said clutch at a predetermined pressure.

4. The combination clutch and clutch torque control means set forth in claim 2, wherein said escapement orifice comprises an adjustable choke valve.

5. The combination clutch and clutch torque control means set forth in claim 2 wherein said switch means includes a switch in parallel with a time relay operable independent of crank angle position, said switch being adapted to open and then close a circuit to the solenoid of the said first valve, said time relay being adapted to open a circuit to the solenoid of the said first valve after said switch has normally reclosed, whereby the solenoid of said first valve is normally continuously energized during a cycle of operation, and is de-energized by said time relay to release the pressure in said clutch when an overload slows or stops the said crankshaft and prevents said switch to close said circuit before said time relay opens said circuit.

6. The combination clutch and clutch torque control means set forth in claim 2, wherein said switch means comprises a series of drum switches adapted to rotate synchronously with the said crankshaft.

7. The combination clutch and clutch torque control means set forth in claim 2, including a mechanical brake secured to said crankshaft, means to de-energize said clutch at substantially top dead center position of said crankshaft, and means to engage said brake responsive to the de-energization of said clutch.

8. The crankshaft driving mechanism set forth in claim 2, wherein said switch means is synchronized to operate as a function of the crank angle position, whereby the torque transmission of said clutch is decayed in accordance with the safe load capacity of said mechanism throughout its workload cycle.

9. The crankshaft driving mechanism set forth in claim 2, wherein said switch means is synchronized to operate as a function of the crank angle position, whereby the torque transmission of said clutch is decayed in accordance with the safe load capacity of said mechanism during the workload portion of the cycle and the torque transmission of said clutch is restored during the return stroke portion of the operating cycle.

10. In combination with a source of fluid pressure and a fluid pressure operable clutch of the type employed to drive mechanical presses and the like, a torque control mechanism comprising: first and second fluid pressure escapements connectable in series to said clutch; a third fluid pressure escapement connectable to said clutch; and means to operate said first, second and third pressure escapements, whereby said source of fluid pressure energizes said clutch for maximum torque transmission, said first pressure escapement effects a reduction in the torque transmitted by said clutch, said third pressure escapement effects a rapid decay in the said clutch torque transmission, and said second pressure escapement cuts off the supply of fluid pressure to said clutch and exhausts all remaining fluid therefrom.

11. In combination with a source of fluid pressure and a fluid pressure operable clutch of the type employed to drive mechanical presses and the like, a torque control mechanism comprising: first and second valves connectable in series between said clutch and said source of pressure, a pressure relief valve connected to said first valve, said first valve being adapted to pass fluid pressure to said clutch in series with said second valve or to pass fluid pressure from said clutch to said pressure relief valve; said second valve being adapted to pass fluid pressure to and from said clutch or to exhaust fluid from said clutch, a third valve connectable to said clutch; an orifice connected to said third valve, said third valve being adapted selectively to transmit fluid from said clutch through said orifice; and means selectively to operate said first, second and third valves, whereby said source of pressure energizes said clutch for high torque transmission, said pressure relief valve effects a reduction in the torque transmitted by said clutch, said third valve effects a rapid decay in the torque transmitted by said clutch, and said second valve cuts off the supply of fluid pressure to said clutch and exhausts all remaining fluid therefrom.

References Cited in the file of this patent

UNITED STATES PATENTS

| 2,149,044 | Clouse | Feb. 28, 1939 |
| 2,210,227 | Williamson | Aug. 6, 1940 |
| 2,214,201 | Moulder | Sept. 10, 1940 |
| 2,644,563 | Crary | July 7, 1953 |
| 2,694,300 | Chergie | Nov. 16, 1954 |

FOREIGN PATENTS

| 852,339 | Germany | Oct. 13, 1952 |